US007987021B2

(12) United States Patent
Takaoka

(10) Patent No.: US 7,987,021 B2
(45) Date of Patent: Jul. 26, 2011

(54) ENVIRONMENT MAP GENERATING METHOD AND MOBILE ROBOT

(75) Inventor: Yutaka Takaoka, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 161 days.

(21) Appl. No.: 12/526,279

(22) PCT Filed: Jan. 18, 2008

(86) PCT No.: PCT/JP2008/051029
§ 371 (c)(1),
(2), (4) Date: Aug. 7, 2009

(87) PCT Pub. No.: WO2008/099652
PCT Pub. Date: Aug. 21, 2008

(65) Prior Publication Data
US 2010/0324769 A1    Dec. 23, 2010

(30) Foreign Application Priority Data
Feb. 13, 2007  (JP) .................................. 2007-031877

(51) Int. Cl.
G06K 9/36    (2006.01)
G05B 19/00   (2006.01)
G01C 11/00   (2006.01)

(52) U.S. Cl. ............ 700/259; 700/245; 701/25; 701/28; 345/419; 382/153; 382/154

(58) Field of Classification Search .................. 700/245, 700/251, 253, 258, 259, 262; 701/23, 25, 701/28; 345/419, 429, 629; 340/995.1, 995.19; 382/153, 154, 285
See application file for complete search history.

(56) References Cited

U.S. PATENT DOCUMENTS
2001/0018640 A1 * 8/2001 Matsunaga .................. 701/301
(Continued)

FOREIGN PATENT DOCUMENTS
JP          2-224986        9/1990
(Continued)

OTHER PUBLICATIONS
Notice of Reason for Rejection for Japanese Appl. No. 2007-031877, dated Sep. 7, 2010.
(Continued)

Primary Examiner — Thomas G Black
Assistant Examiner — Ce Li
(74) Attorney, Agent, or Firm — Finnegan, Henderson, Farabow, Garrett & Dunner, LLP

(57) ABSTRACT

To reduce a calculation time required for generating an environment map in a mobile robot. A mobile robot (100) generates a three-dimensional position data set representing an external environment using measurement information obtained from a range sensor (10). Next, based on an old environment map which is the environment map generated in the past and an amount of movement of the mobile robot (100), at least three-dimensional position data belonging to an area determined as the obstacle area in the old environment map, and three-dimensional position data belonging to an unobserved area which is not included in the old environment map are selected as plane-detection target data from among three-dimensional position data included in the three-dimensional position data set. Then, plane detection is executed using the plane-detection target data. Then, the movable area and the obstacle area which are included in the plane-detection target data are recognized using the results of the plane detection. Lastly, a new environment map is generated by integrating the movable area and obstacle area, which are recognized using the results of the plane detection, with an area determined as the movable area in the old environment map.

7 Claims, 7 Drawing Sheets

U.S. PATENT DOCUMENTS

| | | | |
|---|---|---|---|
| 2001/0024514 A1* | 9/2001 | Matsunaga | 382/106 |
| 2001/0032041 A1* | 10/2001 | Matsunaga | 701/28 |
| 2004/0013295 A1* | 1/2004 | Sabe et al. | 382/153 |
| 2005/0131581 A1* | 6/2005 | Sabe et al. | 700/245 |
| 2006/0025888 A1* | 2/2006 | Gutmann et al. | 700/245 |
| 2006/0064202 A1* | 3/2006 | Gutmann et al. | 700/245 |
| 2006/0241827 A1* | 10/2006 | Fukuchi et al. | 701/23 |
| 2006/0293792 A1* | 12/2006 | Hasegawa et al. | 700/245 |

FOREIGN PATENT DOCUMENTS

| | | |
|---|---|---|
| JP | 4-291405 | 10/1992 |
| JP | 5-143156 | 6/1993 |
| JP | 7-271978 | 10/1995 |
| JP | 2001-266130 | 9/2001 |
| JP | 2003-029832 | 1/2003 |
| JP | 2003-162725 | 6/2003 |
| JP | 2003-266345 | 9/2003 |
| JP | 2003-266349 | 9/2003 |
| JP | 2004-276168 | 10/2004 |
| JP | 2005-92820 | 4/2005 |
| JP | 2005-181099 | 7/2005 |
| JP | 2006-11880 | 1/2006 |

OTHER PUBLICATIONS

Notice of Reason for Rejection for Japanese Appl. No. 2007-031877, dated Sep. 7, 2010.

* cited by examiner

Fig. 5A  THREE-DIMENSIONAL POSITION DATA $P_{i-1}$ OF PREVIOUS FRAME (i-1 FRAME)
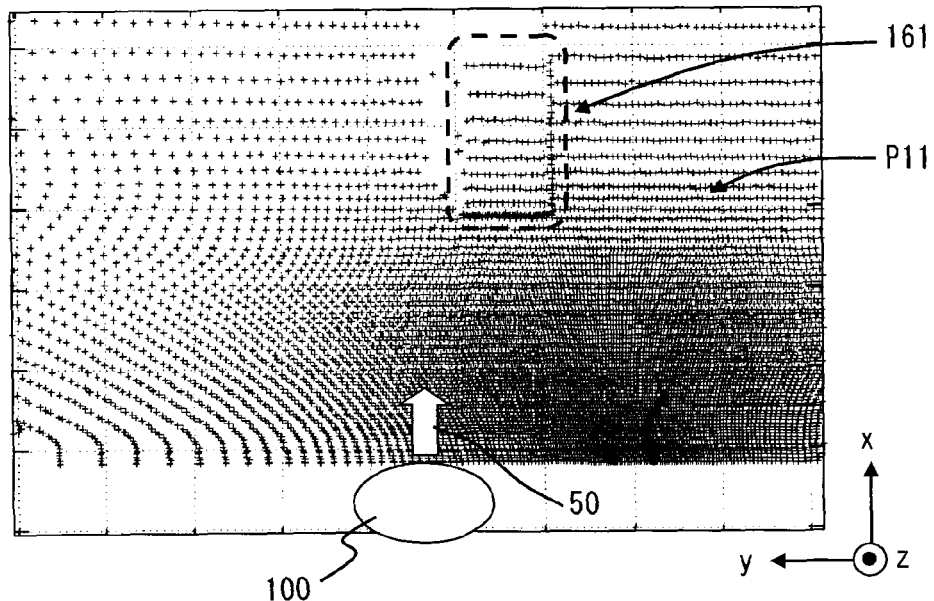
Fig. 5B  THREE-DIMENSIONAL POSITION DATA $P_i$ OF CURRENT FRAME (i FRAME)
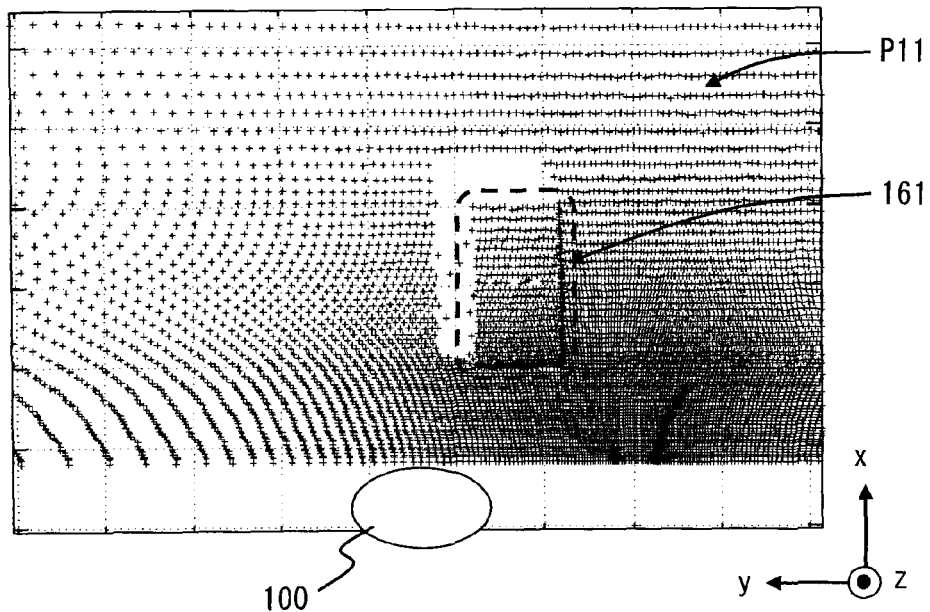

Fig. 6A  THREE-DIMENSIONAL POSITION DATA $P_{i-1}$ OF PREVIOUS FRAME (i-1 FRAME)
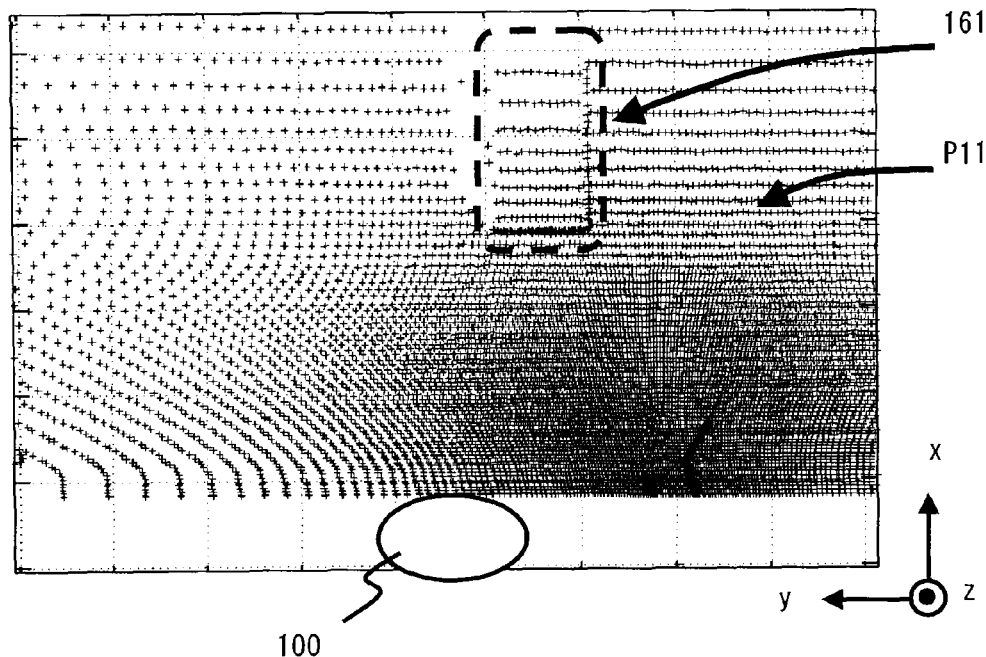
Fig. 6B  THREE-DIMENSIONAL POSITION DATA $P_i$ OF CURRENT FRAME (i FRAME)
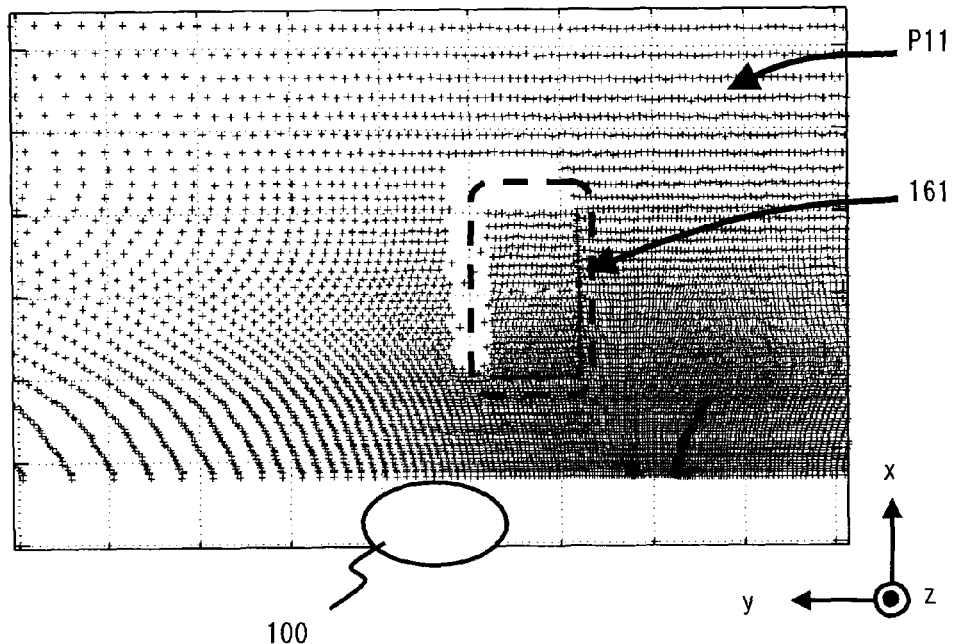

ENVIRONMENT MAP GENERATING METHOD AND MOBILE ROBOT

CROSS-REFERENCE TO RELATED APPLICATIONS

This application is a national phase application of International Application No. PCT/JP2008/051029, filed Jan. 18, 2008, and claims the priority of Japanese Application No. 2007-031877, filed Feb. 13, 2007, the contents of both of which are incorporated herein by reference.

TECHNICAL FIELD

The present invention relates to a method of sequentially generating map information concerning an environment in which a mobile robot moves (hereinafter, referred to as "environment map") in accordance with the movement of the mobile robot.

BACKGROUND ART

Mobile robots that move while autonomously determining a movement path are required to generate an environment map using measurement data obtained from a vision sensor such as a stereo camera or a range sensor, unless the environment map is provided in advance. Additionally, each mobile robot is required to repeatedly performing processing for generating an environment map along with the movement of the robot, since the surrounding environment of the mobile robot changes every moment along with the movement of the mobile robot.

For example, a walking motion of a legged mobile robot is achieved such that areas on which the foot soles can be placed are determined referring to an environment map, and landing positions of the foot soles are sequentially mapped out. Accordingly, the legged mobile robot needs to generate an environment map that allows discrimination between an area belonging to a floor surface on which the foot soles can be placed, and an obstacle area other than the area. A specific example of the environment map is an environment map obtained by detecting a plane group from a three-dimensional position data set calculated based on a parallax image obtained from a vision sensor such as a stereo camera or a range sensor, and based on measurement information such as distance information on a distance from a measurement object. Patent Document 1, for example, discloses a technology in which a plurality of planes including the floor surface in contact with the foot soles of a legged mobile robot are detected by calculating a plane parameter using a three-dimensional position data set, and an environment map specifying an obstacle area and a movable area is generated using the detection results of the plurality of planes.

[Patent Document 1] Japanese Unexamined Patent Application Publication No. 2005-92820
[Patent Document 2] Japanese Unexamined Patent Application Publication No. 02-224986

DISCLOSURE OF INVENTION

Technical Problems

As techniques for detecting planes from a three-dimensional position data set, a plane detection technique using Hough transform, a plane detection technique using random sampling, and the like are known. However, even if any of the conventionally-known plane detection techniques is employed, an amount of calculation required for executing an algorithm for estimating a plane parameter is large. The conventional mobile robots generate an environment map by performing plane detection using positional information about the entire area of a three-dimensional position data set, that is, all the measurement points of the three-dimensional position data set, every time a three-dimensional position data set is obtained. For this reason, a calculation time required for generating an environment map is long, which causes a problem that a waiting time for generating an environment map poses a limitation on the high-speed movement of a mobile robot, for example.

The present invention has been made in view of the above-mentioned circumstances, and therefore has an object to provide a method of generating an environment map capable of reducing a calculation time required for generating an environment map, and a mobile robot.

Technical Solution

A method of generating an environment map according to a first aspect of the present invention is a method for generating an environment map concerning an environment in which a mobile robot moves, the environment map specifying an obstacle area in which an obstacle exists and a movable area in which it is estimated that the mobile robot is movable. The method according to this aspect includes (1) processing for generating a three-dimensional position data set indicating a position of a measurement object existing in the environment, by using measurement information obtained from a vision sensor; (2) processing for selecting, based on an old environment map which is the environment map generated in the past and an amount of movement of the mobile robot, at least three-dimensional position data belonging to an area determined as the obstacle area in the old environment map, and three-dimensional position data belonging to an unobserved area which is not included in the old environment map, from among three-dimensional position data included in the three-dimensional position data set, as plane-detection target data; (3) processing for performing plane detection using the plane-detection target data; (4) processing for recognizing the movable area and the obstacle area which are included in the plane-detection target data, by using results of the plane detection; and (5) processing for generating a new environment map which is an environment map newly generated by integrating the movable area and the obstacle area, which are recognized using the results of the plane detection, with an area determined as the movable area in the old environment map.

In this manner, the plane-detection target data is selected from the three-dimensional position data set by utilizing the results of the plane detection performed in the past, to be specific, the old environment map reflecting the results. This eliminates the need of repeatedly performing plane detection on the three-dimensional position data belonging to the same area on which the plane detection has been performed in the past. Consequently, the amount of calculation required for the plane detection can be greatly reduced, and the time required for generating a new environment map can be reduced, thereby alleviating the problem that the high-speed movement of a mobile robot is limited by a waiting time for generating an environment map.

According to a method of a second aspect of the present invention, in the method according to the first aspect of the present invention, selection of the plane-detection target data is performed by transforming a coordinate system of the old environment map into a coordinate system of the three-dimensional position data set in accordance with the amount of movement of the mobile robot, and by determining overlapping of the old environment map obtained after coordinate transformation and the three-dimensional position data set. Thus, data to be subjected to plane detection in the case of generating the old environment map can be rapidly determined among the three-dimensional position data set newly generated.

According to a method of a third aspect of the present invention, in the selection of the plane-detection target data in the method according to the first or second aspect of the present invention, three-dimensional position data positioned near the area determined as the obstacle area in the old environment map is included in the plane-detection target data. The plane detection is performed on data including peripheral data of the obstacle area in the old environment map, thereby improving the accuracy of recognizing the obstacle area.

A mobile robot according to a fourth aspect of the present invention is a mobile robot which moves in an environment in which an obstacle exists, by utilizing an environment map specifying an obstacle area in which the obstacle exists and a movable area in which it is estimated that no obstacle exists and the mobile robot is movable. The mobile robot includes a vision sensor that visually recognizes the environment; a three-dimensional position data generation unit that generates a three-dimensional position data set indicating a position of a measurement object existing in the environment, by using measurement information obtained from the vision sensor; a plane-detection target data selection unit that selects plane-detection target data to be subjected to plane detection from among the three-dimensional position data set representing the environment, based on an old environment map which is the environment map generated in the past and an amount of movement of the mobile robot; a plane detection unit that performs plane detection using the plane-detection target data; an area recognition unit that recognizes the movable area and the obstacle area which are included in the plane-detection target data, by using results of the plane detection; and an environment map update generation unit that generates a new environment map which is an environment map newly generated by integrating the movable area and the obstacle area, which are recognized by the area recognition unit, with an area determined as the obstacle area in the environment map generated in the past.

In other words, the mobile robot according to the fourth aspect of the present invention selects the plane-detection target data from the three-dimensional position data set by utilizing the results of the plane detection performed in the past, to be specific, the old environment map reflecting the results. This eliminates the need of repeatedly performing plane detection on the three-dimensional position data belonging to the same area on which the plane detection is performed in the past. Therefore, the amount of calculation required for the plane detection can be greatly reduced, and the time required for generating the new environment map can be reduced, thereby alleviating the problem that the high-speed movement of the mobile robot is limited by a waiting time for generating an environment map.

According to a mobile robot of a fifth aspect of the present invention, in the mobile robot according to the fourth aspect of the present invention, the plane-detection target data selection unit selects as the plane-detection target data at least three-dimensional position data belonging to the area determined as the obstacle area in the old environment map, and three-dimensional position data belonging to an unobserved area which is not included in the old environment map, from among three-dimensional position data included in the three-dimensional position data set. Thus, the amount of the plane-detection target data can be reduced and the accuracy of recognizing the obstacle area can be improved.

According to a mobile robot of a sixth aspect of the present invention, in the mobile robot according to the fourth or fifth aspect of the present invention, the plane-detection target data selection unit performs selection of the plane-detection target data by transforming a coordinate system of the old environment map into a coordinate system of the three-dimensional position data set in accordance with the amount of movement of the mobile robot, and by determining overlapping of the old environment map obtained after coordinate transformation and the three-dimensional position data set. Thus, the data to be subjected to plane detection in the case of generating the old environment map can be rapidly determined among the three-dimensional position data set newly generated.

According to a mobile robot of a seventh aspect of the present invention, in the mobile robot according to any one of the fourth to sixth aspects of the present invention, the plane-detection target data selection unit allows three-dimensional position data positioned near the area determined as the obstacle area in the old environment map to be included in the plane-detection target data. The plane detection is performed on data including peripheral data of the obstacle area in the old environment map, thereby improving the accuracy of recognizing the obstacle area.

According to a mobile robot of an eighth aspect of the present invention, in the mobile robot according to any one of the fourth to seventh aspects of the present invention, the vision sensor is structured as a range sensor that obtains as the measurement information a range image having a range value as a pixel value of each pixel of a two-dimensional image, or is structured as a stereo camera that obtains a parallax image as the measurement information.

Advantageous Effects

According to the present invention, it is possible to provide a method of generating an environment map capable of reducing a calculation time required for generating an environment map, and a mobile robot.

BRIEF DESCRIPTION OF DRAWINGS

FIG. 5A is a diagram illustrating an environment map generation method according to an embodiment of the present invention;

FIG. 5B is a diagram illustrating an environment map generation method according to an embodiment of the present invention;

FIG. 6A is a diagram illustrating an environment map generation method according to an embodiment of the present invention;

FIG. 6B is a diagram illustrating an environment map generation method according to an embodiment of the present invention;

| | Explanation of Reference |
|---|---|
| 1 | ENVIRONMENT MAP GENERATION DEVICE |
| 10 | RANGE SENSOR |
| 11 | THREE-DIMENSIONAL POSITION DATA GENERATION UNIT |
| 12 | DATA SELECTION UNIT |
| 13 | PLANE DETECTION UNIT |
| 14 | AREA RECOGNITION UNIT |
| 15 | ENVIRONMENT MAP UPDATE GENERATION UNIT |
| 16 | WALKING PLANNING UNIT |
| 17 | MOTION GENERATION UNIT |
| 18 | CONTROL UNIT |
| 19 | ACTUATOR |
| 20 | ENCODER |
| 100 | LEGGED MOBILE ROBOT |
| 101 | HEAD PORTION |
| 102-129 | JOINT |
| 131R, 131L | FOOT SOLE |
| 141R,141L | HAND PORTION |
| 160 | ENVIRONMENT |
| 161 | OBSTACLE |
| P11 | FLOOR SURFACE |
| 200 | ENVIRONMENT MAP |
| LR | RIGHT LEG LINK |
| LL | LEFT LEG LINK |
| AR | RIGHT ARM LINK |
| AL | LEFT ARM LINK |
| BD | TRUNK PORTION |

BEST MODES FOR CARRYING OUT THE INVENTION

Specific embodiments to which the present invention is applied will be described in detail below with reference to the drawings. The identical components are denoted by the identical reference symbols throughout the drawings, and a repeated explanation is omitted as appropriate for clarification of the explanation.

Embodiment 1

A robot 100 according to this embodiment is a legged mobile robot having two leg links. Additionally, the robot 100 includes an environment map generation device 1. The environment map generation device 1 is a device that receives a range image obtained from a range sensor 10 serving as a vision sensor, and generates an environment map for specifying an obstacle area in which an obstacle exists and a movable area in which it is estimated that no obstacle exists and the robot 100 is movable. The robot 100 determines landing positions of foot soles that are provided at distal ends of the two leg links of the robot 100, by referring to the environment map generated by the environment map generation device 1. Further, the robot 100 generates motion data for realizing the foot sole landing positions thus determined, and uses an actuator to drive a joint group of the robot 100 based on the generated motion data, thereby allowing walking.

Figure 1:
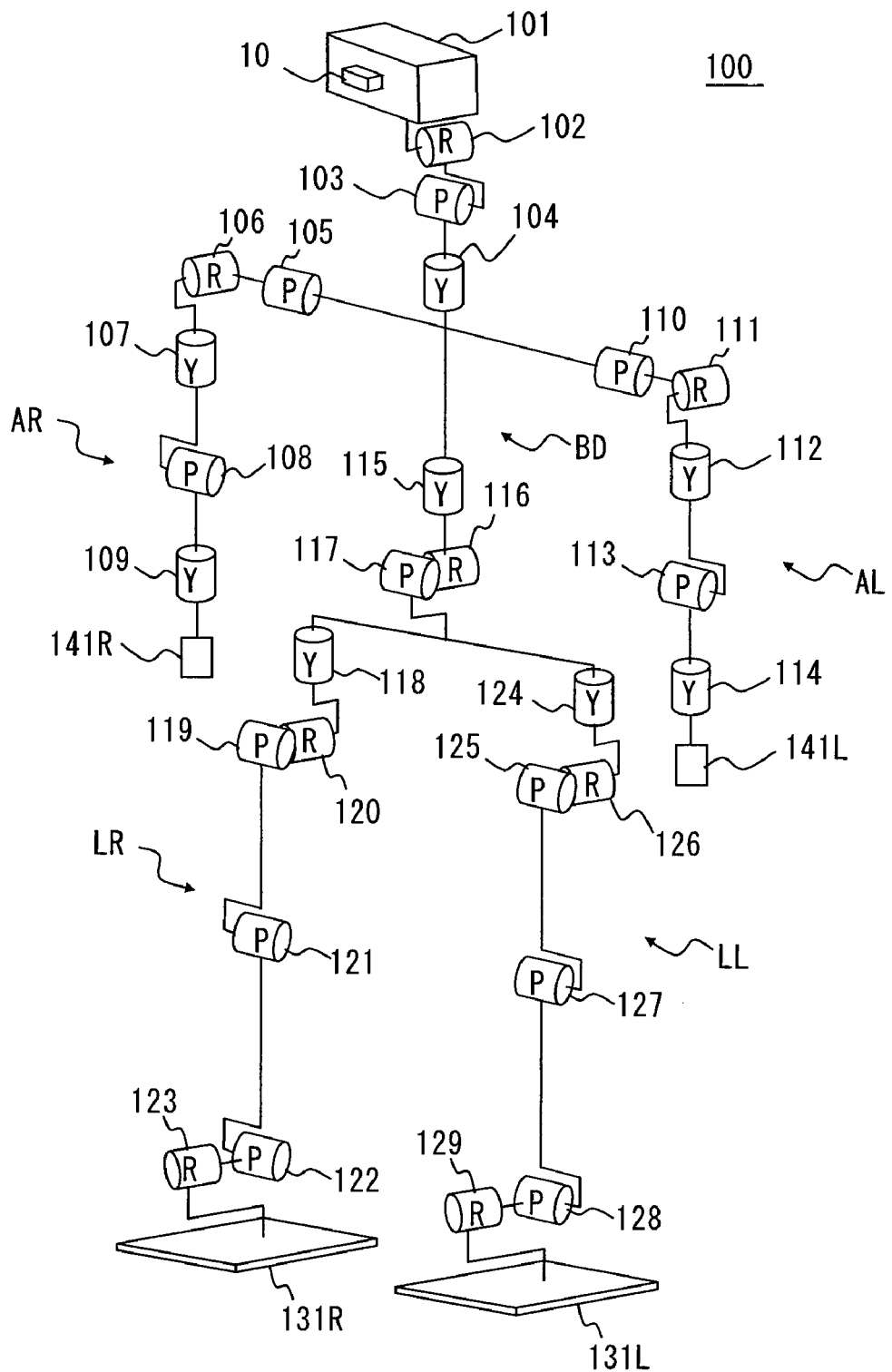
FIG. 1 is a model diagram showing a legged mobile robot according to an embodiment of the present invention.

Referring first to FIG. 1, the degree of freedom of the joints of the robot 100 will be described. FIG. 1 is a model diagram showing the robot 100 with links for connection between the joints. The robot 100 is composed of a head portion 101, two leg links LR and LL, two arm links AR and AL, and a trunk portion BD to which these are connected.

The head portion 101 of the robot 100 is provided with the range sensor 10 for obtaining range image data representing the external environment. Note that the range image data is two-dimensional data including a range value to a measurement object existing in the environment, as a pixel value of each pixel.

A neck joint for supporting the head portion 101 includes a joint 102 in the roll direction, a joint 103 in the pitch direction, and a joint 104 in the yaw direction. The right arm link AR includes a joint 105 of the shoulder in the pitch direction, a joint 106 of the shoulder in the roll direction, a joint 107 of the upper arm in the yaw direction, a joint 108 of the elbow in the pitch direction, and a joint 109 of the wrist in the yaw direction, and is provided with a hand portion 141R at an end of the right arm link AR. Note that the mechanism of the hand portion 141R may be determined depending on the shape, type, and the like of an object to be held. For example, a structure having multiple joints with multiple fingers and having a multi-degree of freedom may be employed.

The left arm link AL has a similar structure as that of the right arm link AR. Specifically, the left arm link AL includes five joints 110 to 114, and also includes a hand portion 141L at an end thereof.

The right leg link LR includes a joint 118 of the hip in the yaw direction, a joint 119 of the hip in the pitch direction, a joint 120 of the hip in the roll direction, a joint 121 of the knee in the pitch direction, a joint 122 of the ankle in the pitch direction, and a joint 123 of the ankle in the roll direction. A foot sole 131R that is in contact with a walking surface is provided at a lower portion of the joint 123 of the ankle.

The left leg link LL has a similar structure as that of the right leg link LR. Specifically, the left leg link LL includes six joints 124 to 129, and also includes a foot sole 131L at an end thereof.

The trunk portion BD 143 includes a joint 115 in the yaw direction, a joint 116 in the roll direction, and a joint 117 in the pitch direction.

Figure 2:
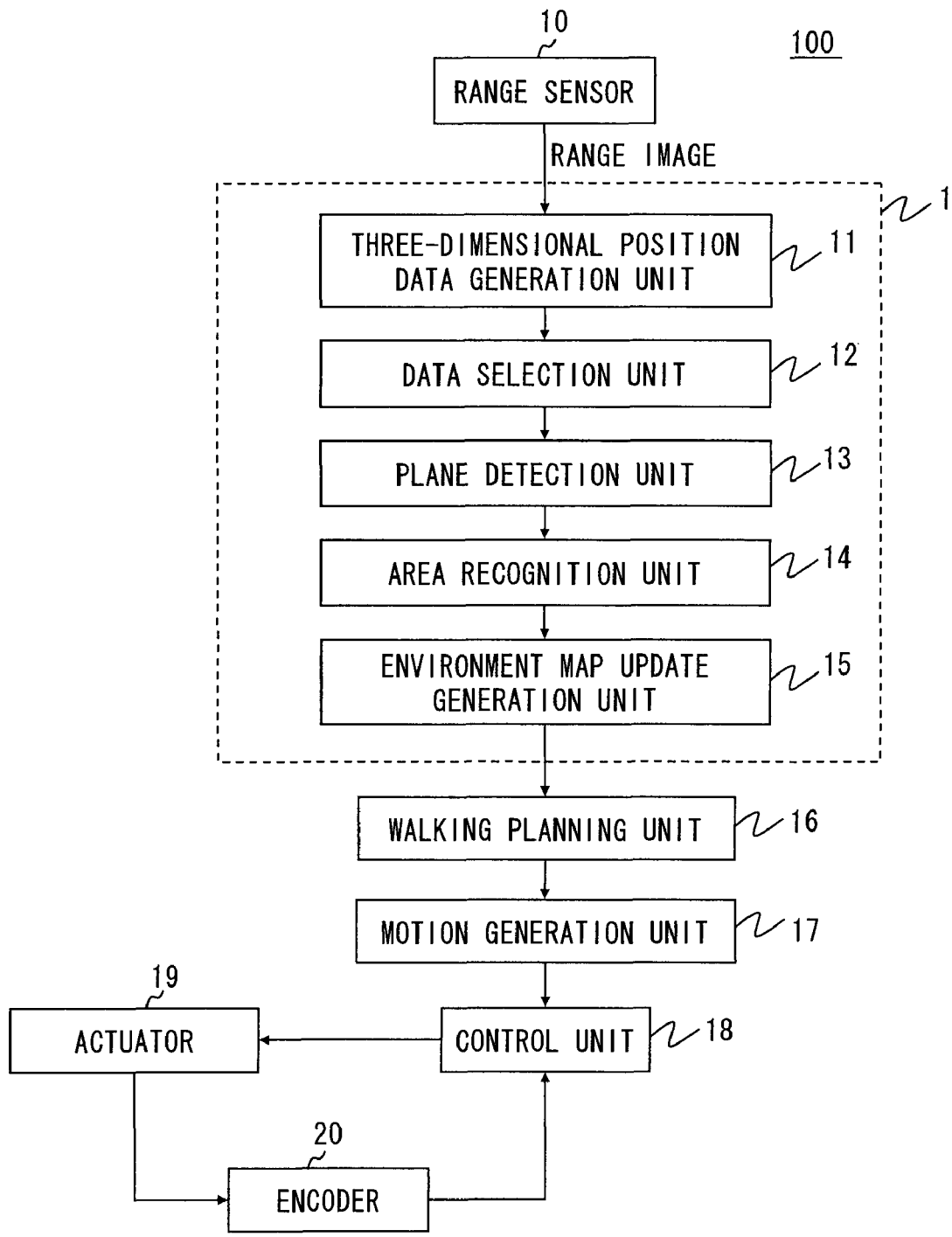
FIG. 2 is a block diagram showing a control system included in the legged mobile robot according to an embodiment of the present invention.

Next, a control system for allowing the robot 100 to walk will be described below. FIG. 2 shows the configuration of the control system of the robot 100. In FIG. 2, the range sensor 10 obtains range image data representing the external environment of the robot 100 in the manner as described above. Note that a stereo camera may be used as a vision sensor in place of the range sensor 10. In other words, a plurality of cameras including an image pickup element such as a CCD (Charge Coupled Device) image sensor or a CMOS (Complementary Metal Oxide Semiconductor) image sensor may be provided to generate range image data by utilizing the parallax between images captured by the plurality of cameras. More Specifically, corresponding points are detected from the image data captured by the plurality of cameras, and three-dimensional positions of the corresponding points are restored by stereoscopic vision. Herein, the corresponding points of a plurality of captured images may be searched by applying well-known techniques such as a gradient method using a constraint equation involving spatial and temporal derivatives for the plurality of captured images, and a correlation method.

The environment map generation device 1 includes a three-dimensional position data generation unit 11, a data selection unit 12, a plane detection unit 13, an area recognition unit 14, and an environment map update generation unit 15. The three-dimensional position data generation unit 11 performs coordinate transformation on the range image data to generate a three-dimensional position data set. Note that the term "three-dimensional position data set" refers to a set of data obtained by expressing position vectors of multiple measurement points included in the range image data, in a three-dimensional orthogonal coordinate system.

The data selection unit 12 selects data (plane-detection target data) for use in plane detection processing performed by the plane detection unit 13 described later, from the three-dimensional position data set, by referring to an old environment map that has been generated in the past. More specifically, the old environment map is superimposed on the three-dimensional position data set, to thereby select three-dimensional position data belonging to an area determined as an obstacle area in the old environment map and three-dimensional position data belonging to an unobserved area that is not included in the old environment map, as the plane-detection target data. Note that the old environment map may be superimposed on the three-dimensional position data set by performing coordinate transformation for moving the old environment map in accordance with an amount of movement of the robot 100 during a period from the time when the old environment map is generated to the time when the range image serving as a basis for the three-dimensional position data set is obtained.

The plane detection unit 13 detects a plane from the three-dimensional position data set selected by the data selection unit 12. Note that the Hough transform method and random sampling method are conventionally employed to detect three parameters (plane parameters) representing an equation of a plane, from the multiple measurement points (three-dimensional position data set). These conventionally-known techniques may be applied to the plane detection according to this embodiment.

The area recognition unit 14 recognizes a floor surface area as the movable area in which the robot 100 can walk on the floor area, based on the results of the plane detection performed by the plane detection unit 13, and recognizes an area including a plane different from the floor surface, as the obstacle area. Note that the term "floor surface" means a plane in contact with the foot soles 131R and 131L of the robot 100. In this regard, however, such area recognition is merely an example. Also in the case of a plane and an inclined plane each having a height different from that of the floor surface, for example, if the foot soles 131R and 131L can be placed on the planes when a difference in height from the floor surface is smaller than a predetermined value, these planes may be recognized as the movable area. Furthermore, it may be determined whether the planes are recognized as the movable area based on results of a comparison between the area of the detected plane and the area of each of the foot soles 131R and 131L.

The environment map update generation unit 15 generates a new environment map that is an environment map newly generated by integrating the movable area and obstacle area, which are recognized by the area recognition unit 14, with a movable area included in the old environment map that is an environment map generated in the past.

Figure 3A:
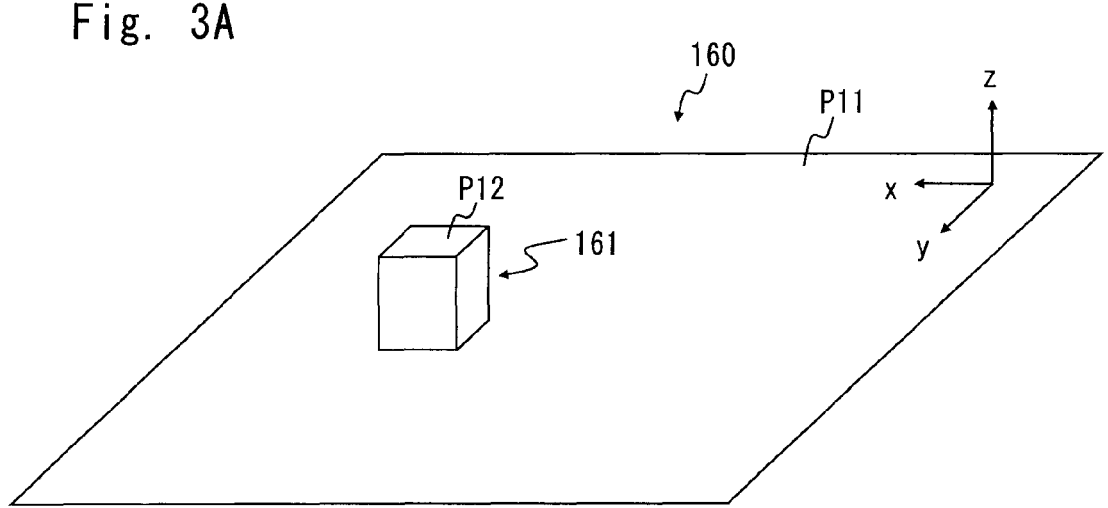
FIG. 3A is a view showing an example of an environment in which the legged mobile robot according to an embodiment of the present invention moves.
Figure 3B:
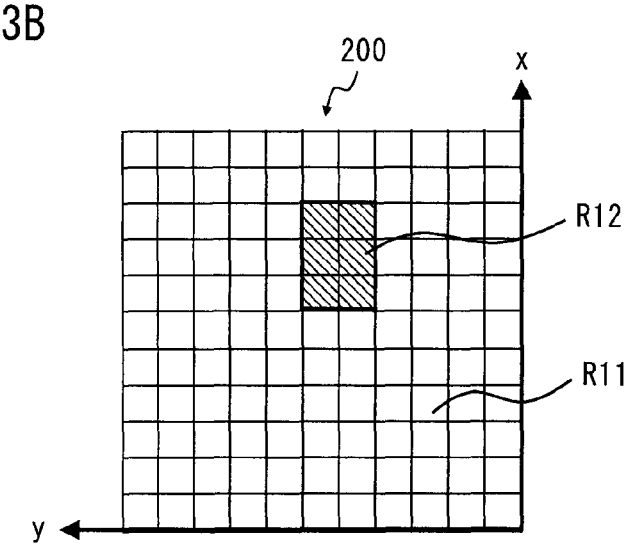
FIG. 3B is a diagram showing an example of an environment map representing an environment in which the legged mobile robot according to an embodiment of the present invention moves.

When the robot 100 walks in an environment 160 shown in FIG. 3A, for example, a plane P11 corresponding to the floor surface and a plane P12 corresponding to the top surface of an obstacle 161 are detected by the plane detection unit 13. Further, the area recognition unit 14 recognizes the plane P11 as the movable area and recognizes the plane P12 as the obstacle area. In this case, an environment map generated by the environment map update generation unit 15 is shown in FIG. 3B. An environment map 200 shown in FIG. 3B holds, as data at each grid, information indicating an area type, that is, identification information indicating the movable area or the obstacle area. In the example of FIG. 3B, an area R11 corresponding to the floor surface P11 is the movable area, and an area R12 (indicated by the shaded area of FIG. 3B) corresponding to the obstacle 161 is the obstacle area.

Referring again to FIG. 2, the description will be continued. A walking planning unit 16 determines a target position by referring to the environment map generated by the environment map generation device 1, and calculates landing positions of the foot soles 131R and 131L to reach the determined target position.

An motion generation unit 17 generates motion data for realizing the landing positions of the foot soles 131R and 131L which are generated by the walking planning unit 16. Herein, the motion data includes the ZMP position of the robot 100, the position of the center of mass, the position and posture of each of the foot soles 131R and 131L, and the position and posture of the trunk portion BD.

A control unit 18 receives the motion data generated by the motion generation unit 17, and calculates a target joint angle of each joint by inverse kinematic calculation. Further, the control unit 18 calculates a torque control value for driving each joint based on the calculated target joint angle and the current joint angle measured by an encoder 20. An actuator 19 for driving each joint according to the torque control value calculated by the control unit 18 is caused to operate, thereby allowing the robot 100 to walk.

Figure 4:
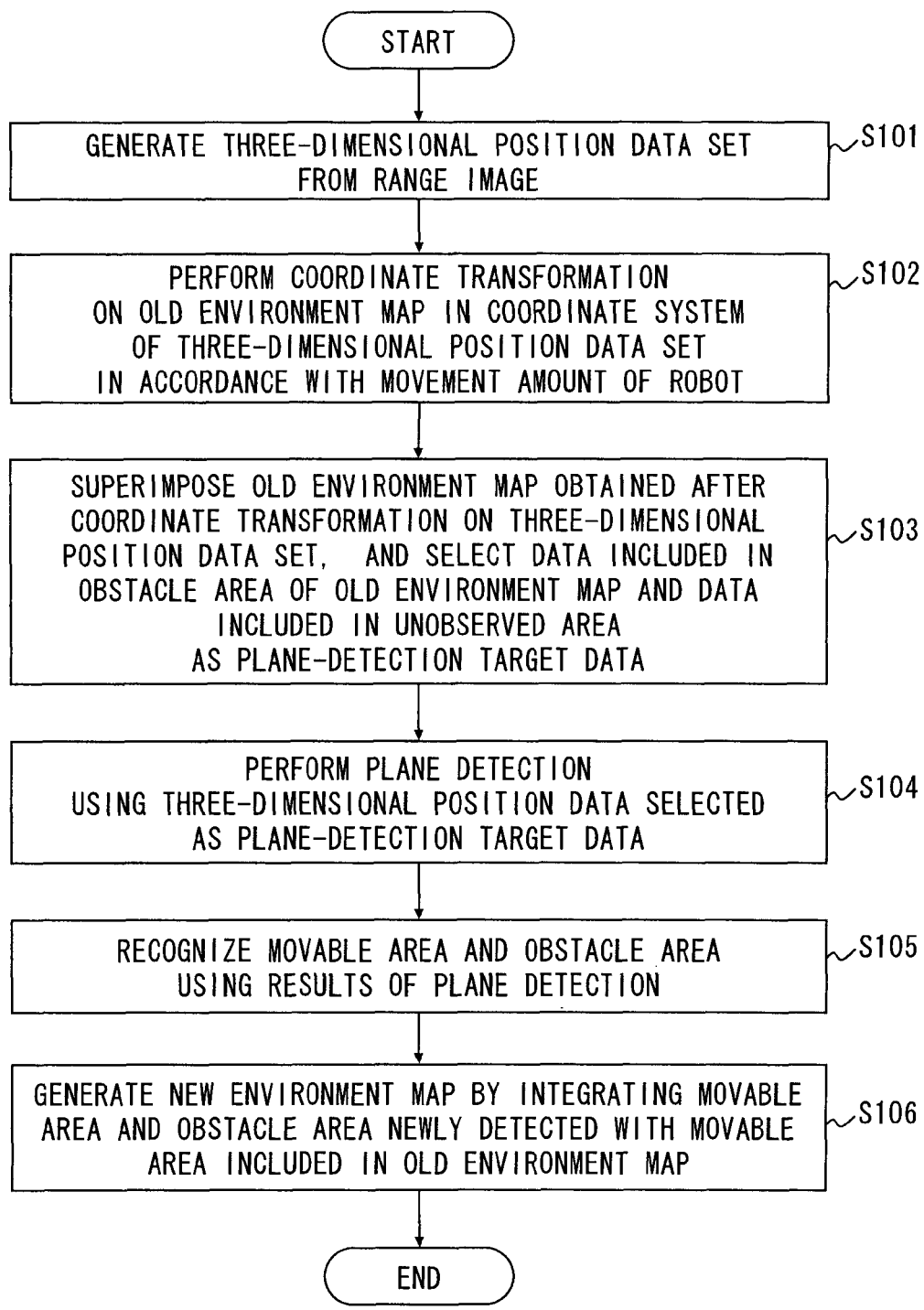
FIG. 4 is a flowchart showing contents of processing of an environment map generation device according to an embodiment of the present invention.

Next, a procedure for generating an environment map by the environment map generation device 1 will be described in detail below with reference to FIGS. 4 to 6D. FIG. 4 is a flowchart showing the procedure for generating an environment map by the environment map generation device 1. First, in Step S101, the three-dimensional position data generation unit 11 generates a three-dimensional position data set using the range image data obtained from the range sensor 10. In Step S102, the data selection unit 12 executes coordinate transformation for superimposing the old environment map on the three-dimensional position data set in accordance with the amount of movement of the robot 100.

In Step S103, the data selection unit 12 selects data to be subjected to plane detection, which is to be performed later, from the three-dimensional position data set, by superimposing the old environment map obtained after the coordinate transformation on the three-dimensional position data set. Specifically, data included in the obstacle area of the old environment map and data included in the unobserved area that is not included in the old environment map are selected as the plane-detection target data. Note that the three-dimensional position data included in the movable area (i.e., an area corresponding to the floor surface in contact with the foot soles 131R and 131L) of the old environment map is directly classified as the movable area by the data selection unit 12.

In Step S104, the plane detection unit 13 detects a plane from the three-dimensional position data selected as the plane-detection target data. In Step S105, the area recognition unit 14 recognizes the floor surface area as the movable area in which the robot 100 can walk on the floor area, based on the results of the plane detection performed by the plane detection unit 13, and recognizes an area included in a plane different from the floor surface, as the obstacle area. Lastly, in Step S106, the environment map update generation unit 15 generates a new environment map by integrating the movable area and obstacle area, which are newly recognized, with the movable area included in the old environment map.

Note that the above-mentioned processing executed by the three-dimensional position data generation unit 11, the data selection unit 12, the plane detection unit 13, the area recognition unit 14, and the environment map update generation unit 15 can be realized using a typical computer system. Specifically, a program for causing a computer system to execute the processing shown in the flowchart of FIG. 4 may be executed by a computer system in response to timer interrupts generated at predetermined time intervals. Note that the program for causing a computer system to execute the processing shown in the flowchart of FIG. 4 is not necessarily a single program, but may be composed of a plurality of program modules that are divided depending on the processing contents.

Referring next to FIGS. 5A to 6D, a description is given of the effect of a reduction in calculation time required for generating an environment map, which is achieved by an environment map generation method according to an embodiment of the present invention. FIGS. 5A and 5B each show an example of a three-dimensional map data set generated by the robot 100. Note that, in FIGS. 5A and 5B, a three-dimensional position data set is plotted in an xy-plane in parallel with the floor surface, and height information (positional information in z-axis direction) regarding plotted points is present.

The image shown in FIG. 5A represents a three-dimensional position data set for use in generating the old environment map, so the image is herein referred to as "previous frame (i−1 frame)". Meanwhile, the image shown in FIG. 5B represents a three-dimensional position data set generated subsequent to the previous frame (i−1 frame), so the image is herein referred to as "current frame (i frame)". The robot 100 illustrated in FIG. 5A moves forward (in a direction indicated by an arrow 50), which causes the three-dimensional position data set to be changed from the previous frame to the current frame. Note that the area surrounded by the broken line in FIGS. 5A and 5B represents the obstacle 161 which is a convex step viewed from the floor surface P11.

Figure 6C:
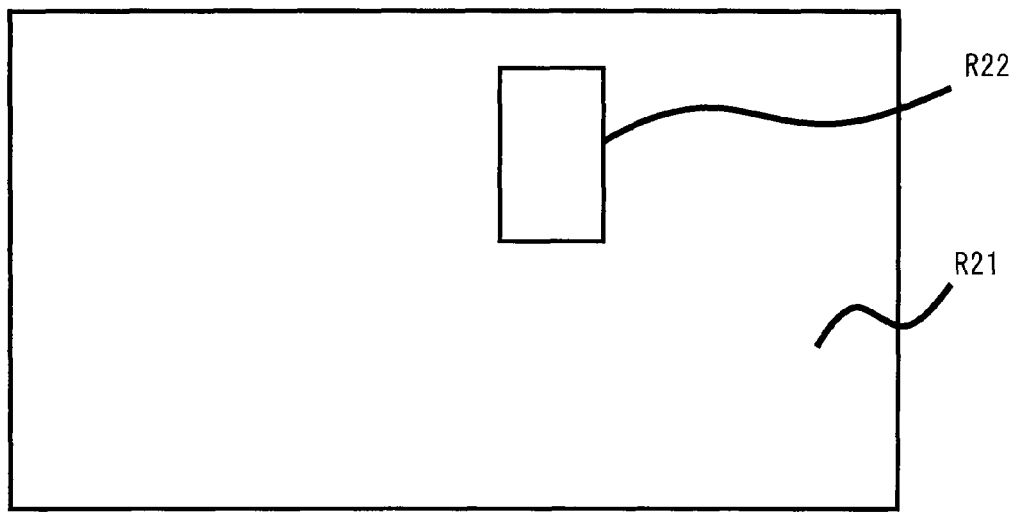
FIG. 6C is a diagram illustrating an environment map generation method according to an embodiment of the present invention.

Next, a description is given of how the plane-detection target data is selected from three-dimensional position data $P_i$ shown in FIG. 5B with reference to FIGS. 6A to 6D. FIGS. 6A and 6B show three-dimensional position data $P_{i-1}$ of the previous frame and three-dimensional position data $P_i$ of the current frame, respectively, which are identical with those of FIGS. 5A and 5B. FIG. 6C shows an environment map $M_{i-1}$ which is generated based on the three-dimensional position data $P_{i-1}$ of FIG. 6A. In the environment map $M_{i-1}$, an area R21 is a movable area corresponding to the floor surface P11. Additionally, an area R22 is an obstacle area corresponding to the obstacle 161.

Figure 6D:
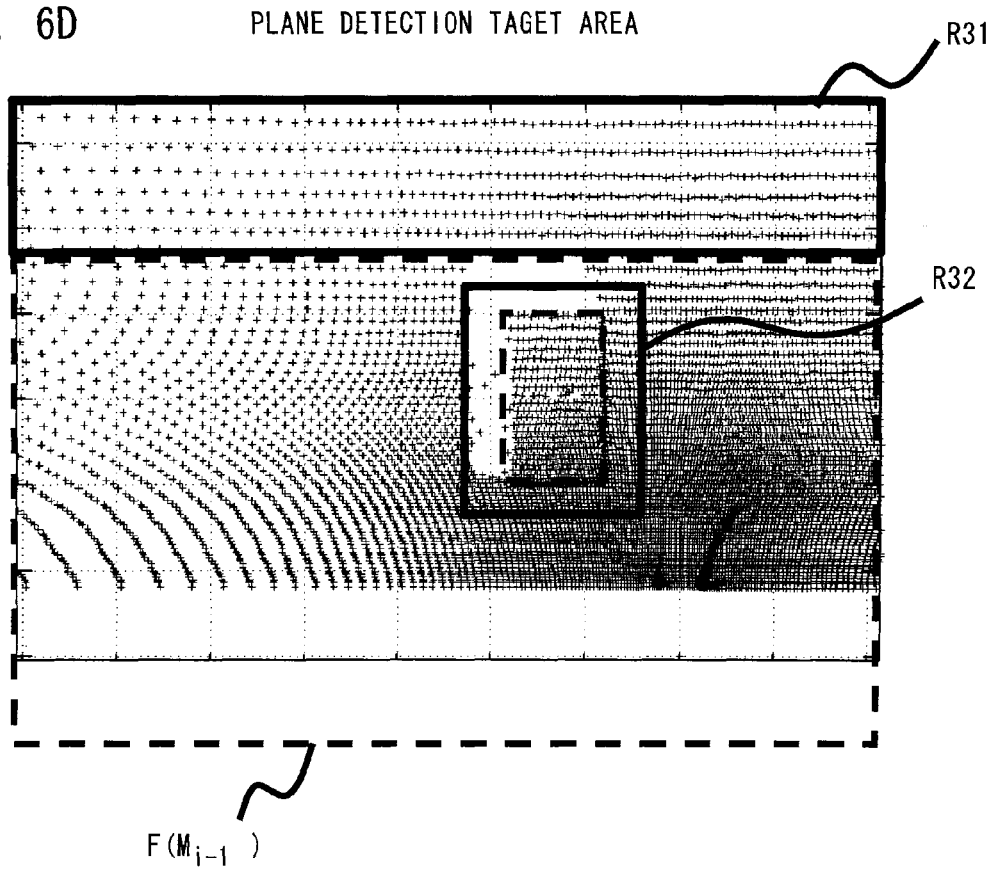
FIG. 6D is a diagram illustrating an environment map generating method according to an embodiment of the present invention.

FIG. 6D is a conceptual diagram showing a state where the plane-detection target data is selected by superimposing $F(M_{i-1})$, which is obtained by performing coordinate transformation on the environment map $M_{i-1}$, on three-dimensional position data $P_i$, of the current frame. The coordinate transformation $F(M_{i-1})$ of the environment map $M_{i-1}$ is generally expressed by the formula (1) below. In the formula (1), "R" represents a rotation matrix, and "t" represents a translation vector. The rotation matrix "R" and the translation vector "t" are determined by reflecting the amount of movement and the change in posture of the robot 100 which are obtained from the measurement information of the encoder 20 and the like.

$$F(M_{i-1}) = RM_{i-1} + t \qquad (1)$$

The area surrounded by the broken line of FIG. 6D represents the environment map $F(M_{i-1})$ obtained after the coordinate transformation. Additionally, areas R31 and R32, each of which is surrounded by the solid line of FIG. 6D, represent areas of the plane-detection target data. Herein, the area R31 is an unobserved area that is not included in the environment map $M_{i-1}$. Meanwhile, the area R32 is an area selected so as to include the obstacle area R22 of the environment map $M_{i-1}$. Note that, like in the area R32, though the amount of plane-detection target data increases when the plane detection is performed on data including peripheral data of the obstacle area R22 of the previous frame, such plane detection has an advantage of being capable of improving the accuracy of recognizing the obstacle area.

As shown in FIG. 6D, as a result of the plane detection of the previous frame, to be specific, as a result of excluding the most part of the movable area (area R21) in the environment map $M_{i-1}$ reflecting this result, from a new target of plane detection, the amount of calculation required for the plane detection can be greatly reduced.

As described above, the robot 100 according to this embodiment selects the plane-detection target data from the three-dimensional position data set by utilizing the old environment map reflecting the results of the plane detection performed in the past. This eliminates the need of repeatedly performing plane detection on the three-dimensional position data belonging to the same area on which the plane detection has been performed in the past. Consequently, the amount of calculation required for the plane detection can be greatly reduced. Therefore, the time required for generating an environment map can be reduced, thereby alleviating the problem that the high-speed movement of the robot 100 is limited by a waiting time for generating an environment map.

Other Embodiment

In the embodiment 1, the robot 100 generates the environment map as shown in FIG. 3B. In other words, the environment map 200 shown in FIG. 3B holds the area type, that is, identification information indicating the movable area or the obstacle area, as data at each grid. However, the configuration of the environment map is illustrative only. For example, a two-dimensional map similar to that of FIG. 3B may hold the height in the z-axis direction as data at each grid. Alternatively, the environment map may hold a plane ID capable of uniquely identifying a plane to which each grid belongs, or may hold values of normal vectors (na, nb, nc) to which each grid belongs. Also in these environment maps, a plane having the same height as the floor surface in contact with the foot soles 131R and 131L, or a plane having a difference in height from the floor surface within a predetermined range is determined as the movable area, and the other planes are determined as the obstacle area, thereby enabling identification of the movable area and the obstacle area.

Further, in the embodiment 1, three-dimensional position data belonging to the obstacle area of the old environment map or the unobserved area that is not included in the old environment map is determined as the plane-detection target data. However, for example, only the three-dimensional position data belonging to the unobserved area may be determined as the plane-detection target data. This further reduces the amount of plane-detection target data.

Furthermore, in the embodiment 1, an example in which the present invention is applied to a legged mobile robot has been illustrated. The present invention can also be applied to a mobile robot including other mobile means such as wheels.

Moreover, the present invention is not limited to the abovementioned embodiments, and various modifications can be made without departing from the gist of the present invention as described above.

INDUSTRIAL APPLICABILITY

The present invention can be applied to a method of sequentially generating map information concerning an environment in which a mobile robot moves (hereinafter, referred to as "environment map") in accordance with the movement of the mobile robot.

The invention claimed is:

1. A method of generating an environment map for generating an environment map concerning an environment in which a mobile robot moves, the environment map specifying an obstacle area in which an obstacle exists and a movable area in which it is estimated that the mobile robot is movable, the method comprising:
   generating a three-dimensional position data set indicating a position of a measurement object existing in the environment, by using measurement information obtained from a vision sensor;
   selecting, based on an old environment map which is the environment map generated in the past and an amount of movement of the mobile robot, at least three-dimensional position data belonging to an area determined as the obstacle area in the old environment map, and three-dimensional position data belonging to an unobserved area which is not included in the old environment map, from among three-dimensional position data included in the three-dimensional position data set, as plane-detection target data;
   performing plane detection using the plane-detection target data;
   recognizing the movable area and the obstacle area which are included in the plane-detection target data, by using results of the plane detection; and
   generating a new environment map which is an environment map newly generated by integrating the movable area and the obstacle area, which are recognized using the results of the plane detection, with an area determined as the movable area in the old environment map,
   wherein the plane-detection target data does not include entire three-dimensional position data belonging to an area determined as the movable area in the old environment map.

2. The method of generating an environment map according to claim 1, wherein said selecting includes transforming a coordinate system of the old environment map into a coordinate system of the three-dimensional position data set in accordance with the amount of movement of the mobile robot, and determining overlapping of the old environment map obtained after coordinate transformation and the three-dimensional position data set.

3. The method of generating an environment map according to claim 1, wherein said selecting includes adding a part of three-dimensional position data belonging to an area determined as the movable area in the old environment map into the plane-detection target data, and the part of data includes three-dimensional position data adjacent to the area determined as the obstacle area in the old environment map.

4. A mobile robot which moves in an environment in which an obstacle exists, by utilizing an environment map specifying an obstacle area in which the obstacle exists and a movable area in which it is estimated that no obstacle exists and the mobile robot is movable, the mobile robot comprising:
   a vision sensor that visually recognizes the environment;
   a three-dimensional position data generation unit that generates a three-dimensional position data set indicating a position of a measurement object existing in the environment, by using measurement information obtained from the vision sensor;
   a plane-detection target data selection unit that selects, based on an old environment map which is the environment map generated in the past and an amount of movement of the mobile robot, at least three-dimensional position data belonging to an area determined as the obstacle area in the old environment map, and three-dimensional position data belonging to an unobserved area which is not included in the old environment map, from among three-dimensional position data included in the three-dimensional position data set, as plane-detection target data;
   a plane detection unit that performs plane detection using the plane-detection target data;
   an area recognition unit that recognizes the movable area and the obstacle area which are included in the plane-detection target data, by using results of the plane detection; and
   an environment map update generation unit that generates a new environment map which is an environment map newly generated by integrating the movable area and the obstacle area, which are recognized by the area recognition unit, with an area determined as the movable area in the environment map generated in the past,
   wherein the plane-detection target data does not include entire three-dimensional position data belonging to an area determined as the movable area in the old environment map.

5. The mobile robot according to claim 4, wherein the plane-detection target data selection unit performs selection of the plane-detection target data by transforming a coordinate system of the old environment map into a coordinate system of the three-dimensional position data set in accordance with the amount of movement of the mobile robot, and by determining overlapping of the old environment map obtained after coordinate transformation and the three-dimensional position data set.

6. The mobile robot according to claim 4, wherein the plane-detection target data selection unit adds a part of three-dimensional position data belonging to an area determined as the movable area in the old environment map in the plane-detection target data, and the part of data includes three-dimensional position data adjacent to the area determined as the obstacle area in the old environment map.

7. The mobile robot according to claim 4, wherein the vision sensor is a range sensor that obtains as the measurement information a range image having a range value as a pixel value of each pixel of a two-dimensional image, or a stereo camera that obtains a parallax image as the measurement information.

* * * * *